June 26, 1934.  J. H. HOERN  1,964,156
METHOD OF MAKING GAPPED PISTON RINGS
Filed June 14, 1930
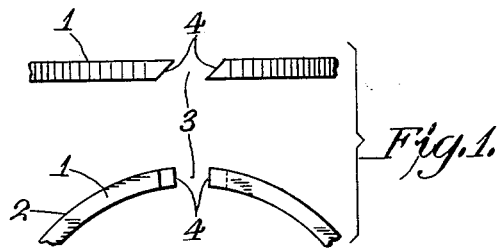
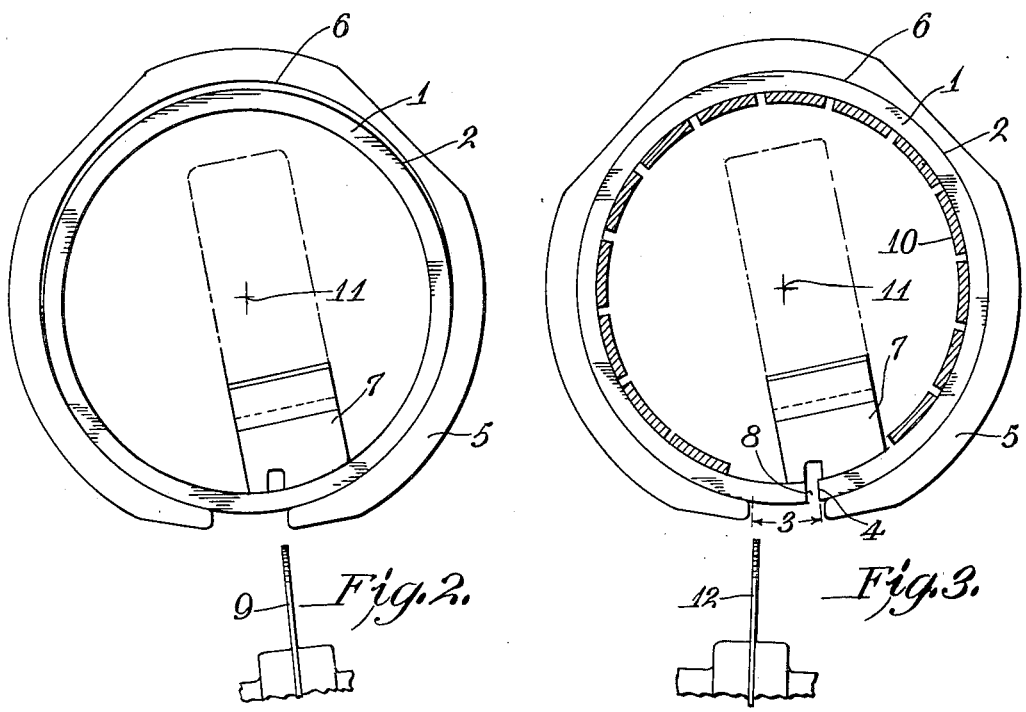
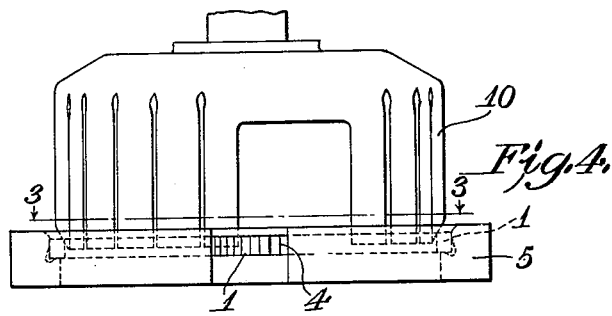
INVENTOR
JOSEPH H. HOERN
BY George B. Willcox.
ATTORNEY Patented June 26, 1934

1,964,156

UNITED STATES PATENT OFFICE 1,964,156

METHOD OF MAKING GAPPED PISTON RINGS

Joseph H. Hoern, Saginaw, Mich., assignor to Wilcox-Rich Corporation, Detroit, Mich., a corporation of Michigan Application June 14, 1930, Serial No. 461,236

2 Claims. (Cl. 29—156.62)

This invention relates to the art of machining cast metal piston rings such as are commonly used in the cylinders of internal combustion engines and in other situations where similar duty is required to be performed.

My invention has to do with the problem of converting continuous or endless cast metal rings which, as is known, are usually of varient peripheral lengths because of differences in shrinkage, variations in molds etc., into gapped rings that all have the same external peripheral length.

My invention also provides a method of cutting the gaps in such a way that the end walls which define the gap shall lie in planes that are disposed in an appropriate angular relation to each other when the ring is free, so as to cause them to fit within a commercially adequate degree of exactness face-to-face when the completed ring is compressed or sprung together sufficiently to close the gap. It is common practice for engine builders to specify that all cast iron piston rings shall meet the following requirements as to size: Firstly, the distance around the outer periphery of the ring from end to end of the gap shall be uniform, within ten one-thousandths of an inch. Secondly, the two ends of the ring that define the gap should be in parallel planes when the ring is compressed to fit the bore of the cylinder in which the ring is to be used, and finally, that these parallel planes shall then be not more than seven to ten-thousands of an inch apart. Extreme accuracy and consistent uniformity of dimensions are, therefore, essential.

It is well known that foundry practice does not produce cast iron rings that are without variance in their peripheral length, and the departure from standard length was in many instances greater than was permitted by the engine builders' specifications.

An object of my invention is, therefore, to produce gapped rings of uniform external peripheral length from a supply of endless cast rings that are of various peripheral lengths. This applies to rings that are "out of round" as well as to rings of the circular type, both of which are well known in the art.

Another object of this method is to sever each ring so as to produce, by only two initial cuts, a gap whose end faces will be parallel and, say, ten-thousandths inch apart when the finished ring is compressed to fit the bore of the engine cylinder, and to accomplish this without any recutting operations at the closed gap.

Heretofore it has been common practice to cut the gap by two circular saws that are spaced apart in parallel planes on a common arbor. The two parallel saws obviously made the end walls of the gap parallel while the gap was fully open, whereas the specified requirement was that they should be parallel when the ring was compressed to the size of the cylinder bore and the end walls of the gap were, say, ten one-thousandths of an inch apart. Therefore, the parallel saw cuts had to be corrected by compressing the ring until the gap walls met, and then passing a saw, say, fifty one-thousandths of an inch thick through the ring in radial direction to true up the end walls where they came together. This first recutting operation only partly corrected the error produced by the parallel saws. So the ring was machined around the outside and the ends where then brought together again and finally another saw, say, twenty-five one-thousandths inch thick, was passed through as before. Even this second recutting did not completely overcome the defect of non-parallelism of the end faces of the ring, but usually sufficed to meet the specification requirements. The operations of cutting the gap, first with parallel saws, then with a thick saw and finally with a thin one entailed considerable adjustment, handling and expense. My method, therefore, has for its further object to overcome this difficulty and to avoid a considerable amount of expense by eliminating the use of the thicker saw, and in most cases the thinner saw also, and doing away with all recutting.

The present method, although capable of being carried out manually without the aid of special machinery, is well adapted for production of rings by high speed automatic machines. Such machines will be found described and claimed in my application co-pending herewith.

With the foregoing and certain other objects in view, which will appear later in the specifications, my invention comprises the devices described and claimed and the equivalents thereof.

In the drawing Fig. 1 is a detail of the ends of a gapped ring as they appear when the ring is in freely expanded position.

Fig. 2 is a plan view of a continuous ring casting clamped in the chuck, the saw being in position to make the initial cut of the gap.

Fig. 3 is a horizontal section on line 3—3 of Fig. 4, showing the initial cut completed and the chuck and ring indexed to the position for the next cut.

Fig. 4 is a side view of a preferred form of ring expander in place on a ring held by the chuck.

In Figs. 2 and 3 the positions of the saws are indicated diagrammatically as though they were in vertical planes.

As is clearly shown in the drawing, numeral 1 indicates a continuous ring casting representing one of a stock lot of castings as received from the foundry. These castings are assumed to have had the foundry burrs removed by grinding their inner and outer peripheral faces in a preliminary manner. All of the stock rings are approximately the same length around their peripheries, but in practice there is always enough variation between individual rings to require some of them to be rejected when made into finished rings by the methods of gap cutting heretofore employed.

By my improved method all of such variant stock material can be converted into gapped piston rings whose outer peripheries 2 are of a uniform and predetermined length.

Moreover, according to my method the end walls 4 that define said gaps are made to lie in approximately radial planes. By the term "radial" I mean that the planes of cut are directed so as to intersect in a central axis, not necessarily the geometrical center of the ring, but an axis that would be located by the intersection of the two planes of the gap ends when the ring is in clamped position, and of the plane that is common to said ends when they are brought together by compressing the ring.

The proposed method consists in placing a ring casting 1 in an appropriately ring-shaped chuck 5 mounted for angular indexing adjustment about its axis 11. Obviously, the inner periphery 6 of chuck 5 need not be in the form of a continuous wall as shown, but may, if desired, be fashioned differently. For example, it may be made up of a plurality of pins or stop members, spaced apart in a circular row, or, if the rings are of the out-of-round type, an approximately circular row of retaining posts or studs, not shown, may be used.

The ring is then clamped, as by a jaw 7, to the inner wall 6 of the chuck at a place on the ring near the desired location of the prospective gap. Jaw 7 may be actuated for clamping and releasing the ring in known manner, not shown.

The next step of the method is to sever the ring at a predetermined place adjacent the clamped portion by making a radially directed transverse cut 8 through the ring. The cut may be at right angles to the plane of the ring, as shown in Fig. 3, or oblique thereto, as shown in Fig. 1.

After the cut 8 has been made, preferably by a suitably mounted saw 9, the severed ring is expanded by internal application of outward force, as by an expansible chuck 10 or its equivalent, in a manner to cause the outer periphery 2 of the ring to completely register with the inner periphery 6 of the chuck, as shown in Fig. 3. The ring, while so expanded against the wall of the chuck, is again severed along a second radially directed plane peripherally distant from cut 8 by an approximate amount, 3, as shown in Fig. 3. This is preferably accomplished by turning the chuck and ring about their common axis 11 to index the ring to a new angular position in operative relation to a saw 12 that is located in any convenient place around the chuck. However, by properly repositioning the chuck, the same saw 9 that was used for the first cut may be utilized for making the second cut. Instead of rotating the chuck, the saw or saws may be indexed and the chuck kept stationary.

When any individual ring has been severed at 8 and has been fully expanded so as to fit accurately all around the inside wall of the chuck, as shown in Fig. 3, its outer wall 2, regarded as continuous, would be exactly the same length as the inner wall 6 of the chuck, also assumed to be uninterrupted.

The rings, now all alike as to their outer peripheral length and width of the gap and also as to the accurate parallelism of their end faces, possess all of the desirable features set forth in the statement of the objects of my invention.

These steps are of course to be followed by the machining of the outer peripheries of the rings by the usual pot chuck method, which consists of springing the rings inward to almost close the gaps, inserting them in a pot chuck, clamping them endwise, removing the pot chuck and machining the rings in a lathe or grinder.

Hence a supply of rings, although originally of variant sizes, including rings that are under size, can all be made of exactly the same external peripheral length, with gap ends that are parallel when the rings are compressed so as to close or to nearly close the gaps. The variances in the original ring sizes are thus absorbed in the discarded gap pieces.

Having thus described my invention, what I claim and desire to secure by Letters Patent is:

1. The method of producing, from ring castings having variant peripheral lengths, gapped piston rings whose outer peripheries are of a uniform predetermined length, the end walls that define the gaps lying in planes disposed in appropriate angular relation to each other to cause them to fit face-to-face in parallel relation when the ring is compressed sufficiently to close the gap, said method consisting in placing a ring casting in a ring-shaped chuck, clamping the ring to the inner wall of the chuck only at a place on the ring near the desired location of the gap, severing the ring at a place adjacent the clamped portion by a radially directed cut, expanding the ring while so clamped, by internal application of outward forces in a manner to cause the outer periphery of the ring to come into register throughout its length with the inner periphery of the chuck, indexing the chuck by a predetermined amount from the plane of the first cut and cutting through the ring casting while so expanded, along a second radially directed plane, and finally machining the outer peripheral face of the ring.

2. The method of producing, from continuous ring castings having variant peripheral lengths, gapped piston rings whose outer peripheries are of a uniform predetermined length, and the gaps therein are also of a predetermined uniform length where the rings are expanded to a given external diameter, the end walls that define said gaps lying in planes disposed in appropriate angular relation to each other to cause them to fit face-to-face when the ring is compressed sufficiently to close the gap, said method consisting in placing a ring casting in a ring-shaped chuck, the length of the inner periphery of said chuck being identical with the desired length of the outer periphery of the gapped ring plus the distance between its ends when the ring is in said expanded condition, clamping the ring to the inner wall of the chuck at one place only on the ring near the desired location of the gap, severing the ring at a place adjacent the clamped portion by a substantially radially directed transverse cut, expanding the ring by internal application of outward force in a manner to cause the outer periphery of the ring to come into register with the inner periphery of the chuck, and again cutting through the ring while so expanded, along a second radially directed plane appropriately indexed from the plane of said first mentioned cut and finally machining the external peripheral wall of the ring.

JOSEPH H. HOERN.